United States Patent [19]

Harada et al.

[11] Patent Number: 4,696,981

[45] Date of Patent: Sep. 29, 1987

[54] METHOD OF MANUFACTURING POLYAMINO ACID WITH MICROWAVES

[75] Inventors: Kaoru Harada; Akira Shimoyama, both of Ibaraki; Hiroji Mizumoto, Osaka, all of Japan

[73] Assignee: Diamond Shamrock Chemicals Company, Irving, Tex.

[21] Appl. No.: 839,353

[22] Filed: Mar. 13, 1986

[30] Foreign Application Priority Data

Mar. 25, 1985 [JP] Japan ................................. 60-60219

[51] Int. Cl.$^4$ ............................................. C08G 69/10
[52] U.S. Cl. ............................. 525/328.2; 525/328.4; 525/420; 525/421; 526/303.1; 526/304; 526/306; 526/307; 526/307.3; 526/307.4; 526/311; 526/312; 526/922; 526/923; 528/271; 528/328; 528/361; 528/367
[58] Field of Search ............... 528/328, 271, 361, 367; 526/303.1, 304, 306, 307, 307.3, 307.4, 311, 312, 922, 923; 525/328.2, 328.4, 420, 421

[56] References Cited

U.S. PATENT DOCUMENTS 4,325,794  4/1982  Hunter et al. ................... 526/303.1
4,590,260  5/1986  Harada et al. ...................... 528/328

Primary Examiner—Harold D. Anderson
Attorney, Agent, or Firm—Browdy and Neimark

[57]  ABSTRACT

Homopolyamino acids and copolyamino acids are prepared by polycondensation of one kind or a mixture of two or more kinds of monoammonium, diammonium, monoamide, diamide or monoamideammonium salts of malic acid and/or maleic acid and/or fumaric acid, one kind or two or more kinds of amino acid being added to said raw materials, respectively, with application of microwaves, the resulting polyamino acids (imide type) being converted to peptide type, homopolyamino acids and copolyamino acids, respectively upon partial hydrolysis. The operation involved in the reaction is simple and the method permits the use of low cost reaction materials. As a result, imide type and also peptide type, homopolyamino and copolyamino acids are produced with uniform quality at a high rate of yield within an extremely short period of time. Accordingly, the method is incomparably superior to those which have been announced in the past.

12 Claims, 1 Drawing Figure

METHOD OF MANUFACTURING POLYAMINO ACID WITH MICROWAVES

BACKGROUND OF THE INVENTION

1. Field of the Invention

The invention is related to making improvements in synthesizing homopolyamino acids or copolyamino acids.

b 2. Description of the Prior Art

Synthetic polyamino acids as protein model compounds are considered important as "biopolymers". Accordingly, applications in the industrial sector have become very active within the past years.

These synthetic amino acids have attracted attention as polymers for fixing useful bacterium and enzymes, carriers of fixing chemicals, special bonding materials, gas permeable membrane, antithrombus agents, foundation for cosmetics, skin covering materials, synthetic leather, ion exchange resins, chelating agents, foaming agents, fibers and various types of films.

Conventional methods of obtaining polyamino acids are given below. (1) The well known method of directly heating and polycondensing amino acids [Ann., 157, 24, (1871); J.C.S., 851 (1953); J.A.C.S., 80 , 3361 (1958); J.A.C.S., 80, 2694 (1958); J.A.C.S., 82, 3745 (1960)]. (2) Method of decarboxylation polymerization by using N-carboxyl acid anhydride (NCA) of amino acid [J.A.C.S., 79, 3961 (1957); J. Poly. Sci., A5, 2867 (1967); J. Poly. Sci., A14, 2065 (1976); Japanese Patent Publication Nos. 1967 (42)-20793 and 1971 (46)-27828]. (3) Method of polymerizing activated amino acid ester [Japanese Patent Public Disclosure (Laid-Open Publication) No. 1979 (54)-47799; J. Macromol, Sci. Chem., A15, 999 (1981); Khim, Prir. Soedin, 773, (1973)]. (4) Method of polymerizing N-dithiocarbonylalcoxylcarbonyl amino acid by heating [Japanese Patent Publication No. 1970 (45)-9391]. (5) Method of polymerizing acid chloride hydrochloride of amino acid (DOS 2364152).

However, obtaining polyamino acid by Method (1) aforementioned has disadvantages due to thermal decomposition of starting materials and formation of diketopiperazine, a byproduct formed by cyclization of dipeptide. Method (2) is widely used at present, but it has the disadvantage of using toxic phosgene in addition to problems brought about by the fact that NCA is unstable especially in relation to moisture and that it is difficult to manufacture the substances in large quntities. In methods mentioned above other than Method (1), the high production costs of the methods are prohibitive in terms of practical use.

The inventor has been successful in inventing a method of obtaining copolyamino acids [Japanese Patent Application No. 1984 (59)-60160] by mixing ammonium salts or amide of malic acid, fumaric acid and maleic acid with amino acid and heating the mixture in an oil bath to promote easy polycondensation.

Microwave is used widely in radar and other communication facilities and it is also making a major contribution in spectroscopy in the physical and chemical sectors. It is also used in household electronic ranges. However, microwave is rarely used for chemical reactions. Some of the typically rare examples are crosslinking polyurethane and plyester [RGE, Rev. Gen. Electr., 826, (1981)], polymerization of difluoroethylene [Eur. Polym., J., 15, 265, (1979)], manufacture of bonding agents [Japanese Patent Public Disclosure (Laid-Open Publication) No. 1978 (53)-109535], and manufacture of polyurethane foam (U.S. Pat. No. 3,294,879).

As mentioned above, there are disadvantages in the conventional methods of manufacturing polyamino acids such as unstable starting monomers, high prices, or complicated proceses. Furthermore, the method covered by Japanese Patent Application No. 1984 (59)-60160 is handicapped by requiring a comparatively long reaction time.

SUMMARY OF THE INVENTION

It is an object of the invention to provide a method of manufacturing homopolyamino acids and copolyamino acids having excellent quality at high yield in an extremely short reaction time.

Other objects and advantages of this invention will become apparent to those skilled in the art by reference to the detailed description of the invention.

DESCRIPTION OF THE PREFERRED EMBODIMENTS

Figure 1:
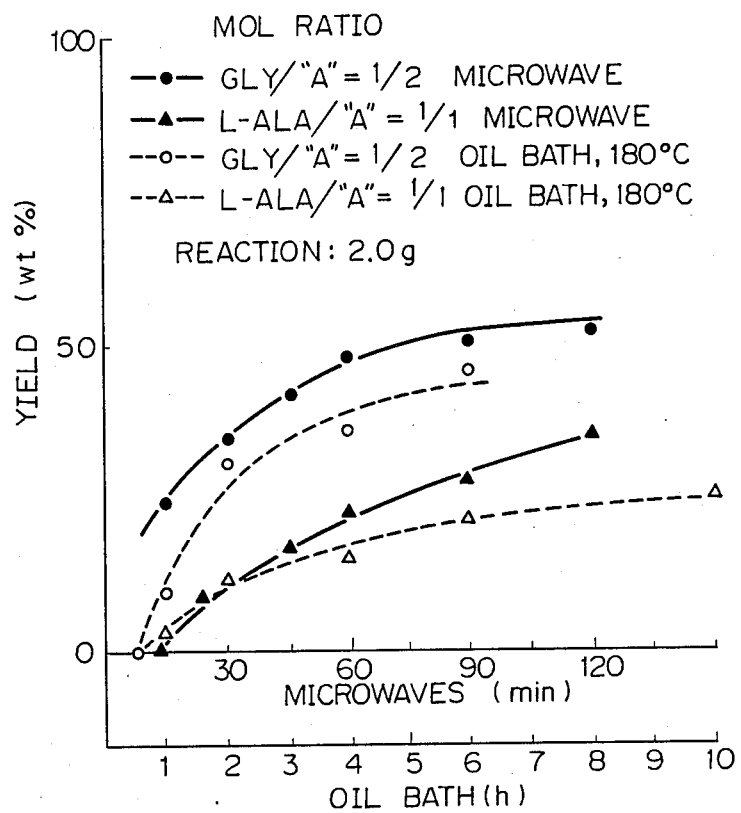
FIG. 1 shows a comparison of the yields of copolyamino acids obtained with microwaves and an oil bath.

The method of manufacturing a homopolyamino acid (imide) is characterized by polycondensation of one kind or a mixture of two or more kinds of monoammonium, diammonium, monoamide, diamide or monoamideammonium salts of malic acid and/or maleic acid and/or fumaric acid, with application of microwaves.

The method of manufacturing a copolyamino acid (imide) is characterized by copolycondensation of one kind or a mixture of two or more kinds of monoammonium, diammonium, monoamide, diamide or monoamideammonium salts of malic acid and/or maleic acid and/or fumaric acid with the addition of one kind or two or more kinds of amino acid with application of microwaves.

The resulting homopolyamino acid (imide) and copolyamino acid (imide) are converted to corresponding peptide, homopolyamino acid and copolyamino acid upon partial hydrolysis at pH 5–12.

As to the microwaves, 1000 MHz to 1000 KMHz used, but 2000 to 3000 MHz is more preferable. 2450 MHz can be used for the sake of convenience with electronic ranges. It is desirable to use microwaves under nitrogen atmosphere for irradiation. A period of several seconds to a few hours is generally sufficient as the exposure time.

Working pressure is acceptable under normal pressure, if water produced from the condensation reaction is discharged from the system. The pressure of the system can be reduced to remove the water thoroughly. Furthermore, azeotropic dewatering can be employed. The polycondensation reaction is sufficiently promoted without the use of catalysts, but pyrosulfuric acid, phosphonates, phosphites, phosphoric acid, sulfonic acids, quanternary ammonium salts and the like can be used as condensation catalysts and co-use of solvents is allowed as long as they do not fundamentally impede the progress of the reaction.

The amino acids mentioned herein are referred to as α-, β-, γ-, δ- and ε-amino acids. Namely, neutral α-amino acids such as glycin, alanine, phenylalanine, leucine, isoleucine, valine, methionine, cystine, cysteine, serine, and threonine; acidic α-amino acids such as aspartic acid, glutamic acid, α-aminoadipic acid, aminomalonic acid, α-aminopimelic acid, α-aminosebacic acid, β-methyl-glutamic acid, and β,β-dimethylaspartic acid; free and partial salts of basic α-amino acids such as ornithine, lysine, arginine and histidine; β-amino acids such as β-alanine, β-phenylalanine, β-amino butyric acid, α-methyl β-aminopropionic acid, isoserine, β-tyrosine, and taurine; γ-amino acids such as γ-amino butyric acid and its derivatives; δ-amino acids such as δ-amino valeric acid and its derivatives; ε-amino acids such as ε-amino caproic acid and its derivatives. The γ-, δ-, or ε-amino acid derivatives are defined as ones which contain the γ-, δ- or ε-amino acid structure in their molecula.

Optically active or inactive amino acids may both be used for the production of copolyamino acids. The forms of the amino acids (L or D or DL) can be suitably selected in accordance with the intended applications of the production of copolyamino acids.

Neutral or alkaline, partial hydrolysis of the polycondensed products (imide type) makes it easy to obtain peptide type, homopolyamino acids or copolyamino acids.

The method used in the invention drastically shortens the reaction time, as compared with conventional methods using an oil bath as a means of heating, and the yield is high. Further, as compared with reaction by thermal conduction using an oil bath, a uniform reaction takes place internally and a more uniform polymer is obtained. This type of a reaction is much more advantageous in many aspects when carrying out large-scale production, especially from the energy standpoint.

Accordingly, the operation involved in the reaction is simple and the method permits the use of low cost reaction materials. As a result, imide type and peptide type, homopolyamino and copolyamino acids are produced with uniform quality at a high yield within an extremely short period of time. Therefore, the method is incomparably superior to those which have been announced in the past.

The reaction of obtaining anhydropolyaspartic acid (imide) and polyaspartic acid (peptide) from malic acid monoammonium salt is expressed as follows:

acid (referred to as "C") were put into a test tube and placed in an electronic range, Model No. RO-1700, manufactured by Mitsubishi Electric Co. (output: 500 W; frequency: 2450 plus/minus 50 MHz; oscillating tube: 1035 W (10.35 A). Polycondensation was carried out by irradiating the mixture with microwaves for predetermined periods of time.

The reactant was dispersed by addition of distilled water and the aqueous mixture was dialyzed for a period of 24 hours, using a cellophane dialyzing membrane (24 Å pore). Then the mixture was freeze-dried to obtain the homopolymer (imide type). The yields are given in Table 1.

The polymer thus obtained indicated negative in the ninhyrin test and the biuret test showed positive. Infrared absorption spectrum of the polymer indicated absorption near 1700 cm$^{-1}$ and 1780 cm$^{-1}$ indicating five-membered cylic imide of anhydropolyaspartic acid residue.

The polymer was partially hydrolyzed by an aqueous solution of sodium bicarbonate. The solution was made acidic by adding 10% acetic acid and dialyzed and then freeze-dried. The product thus obtained showed strong absorptions of amide I 1650 cm$^{-1}$ and of amide II 1550 cm$^{-1}$, and exhibited absorption of carboxyl group near 1700 cm$^{-1}$.

Accordingly, it was found that the polymer obtained from polycondensation by microwaves was structurally anhydropolyaspartic (imide type), and the polymer was partially hyddrolyzed with aqueous sodium bicarbonate to obtain a peptide type homopolyamino acid (polyaspartic acid) having free carboxyl groups.

The polymer obtained from plycondensation ("A", reaction time 45 minutes) was hydrolyzed with 6N-HCl at 110° for 24 hours in a sealed tube under reduced pressure. Aspartic acid (86.1%) was detected with an automatic amino acid analyzer.

TABLE 1

Yields of homopolyamino acid obtained from polycondensation of "A", "B" and "C" by microwaves

| Reaction Time (min) | "A" | "B" Yield (wt %) | "C" |
|---|---|---|---|
| 15 | 32.6 | — | — |
| 30 | 38.6 | 51.1 | 43.1 |
| 45 | 45.6 | — | — |
| 60 | 51.2 | — | — |
| 90 | 53.5 | — | — |

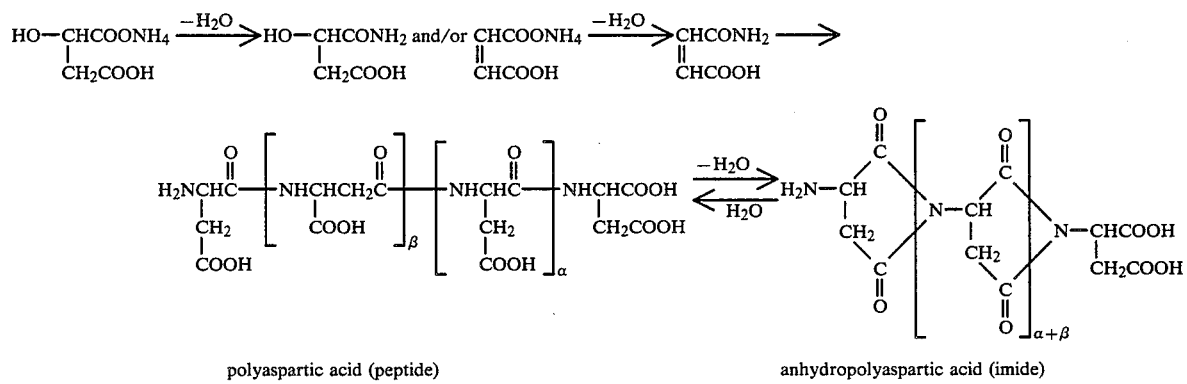

polyaspartic acid (peptide)   anhydropolyaspartic acid (imide)

Explanations of the invention are given below in more detail by way of examples and the present invention is in no way restricted by them.

EXAMPLE I 2.0 grams each of malic acid monoammonium salt (referred to as "A"), maleic acid monoammonium salt (referred to as "B"), and ammonium salt of maleamic Yield (wt %) = $\frac{\text{Produced polyamino acid (g)}}{\text{Charged raw material (g)}} \times 100$

EXAMPLE II

Malic acid monoammonium salt "A" and one kind of various amino acids [Glycin (Gly), L-Alanine (L-Ala), L-Valine (L-Val), L-Glutamic Acid (L-Glu), L-Phenylalanine (L-Phe), L-Lysine-monohydrochloride (L-Lys-HCl)] were mixed at various mol ratios and processed as in the case of Example I.

The copolyamino acids (imide type) thus obtained were placed in a sealed tube with 6N HCl and were hydrolyzed at 110° C. for a period of 24 hours under reduced pressure. The yields (wt %) of the copolymers and the amino acid compositions (mol %) of said copolyamino acid obtained by an automatic amino acid analyzer are shown in Table 2. The amino acid contents in the copolyamino acids are also higher than those obtained by using oil bath.

For comparison, the yields of the copolyamino acids and the amino acid compositions obtained by heating with oil bath (all conditions were the same as Example I other than heating in an oil bath at 180° C. for 4 hours) are indicated in Table 2 in parentheses.

A comparison of time course of the yields obtained by utilizing microwaves and an oil bath is shown in FIG. 1. As can be clearly seen, the time taken for reaction with microwaves is shorter and the polymer yields are higher.

TABLE 2

Yields of copolyamino acid obtained from mixtures of malic acid monoammonium salt ("A") and amino acid, and compositions of amino acid

| Amino Acid: "A" (mol ratio) | Yield (wt %) | Amino Acid (mol %) | Aspartic Acid (mol %) |
|---|---|---|---|
| Gly 1:2 | 41.4 (30.1) | 40.8 (34.3) | 59.2 (65.7) |
| L-Ala 1:1 | 16.5 (14.7) | 57.2 (42.6) | 42.8 (57.4) |
| L-Val 1:1 | 52.0 (31.5) | 70.6 (35.1) | 29.4 (64.9) |
| L-Glu 1:2 | 31.3 (33.1) | 18.4 (13.5) | 81.6 (86.5) |
| L-Phe 1:2 | 71.3 (64.9) | 51.3 (40.0) | 48.7 (60.0) |
| L-Lys—HCl 1:2 | 54.4 (48.1) | 42.2 (38.7) | 57.8 (61.3) |

$$\text{Yield (wt \%)} = \frac{\text{Produced copolyamino acid (g)}}{\text{Charged raw material (g)}} \times 100$$

What is claimed is:

1. A method of manufacturing anhydropolyaspartic acid (imide) by irradiating with microwaves, any one member selected from the group consisting of monoammonium, diammonium, monoamide, diamide and monoamideammonium salts of malic acid, maleic acid fumaric acid and mixtures thereof.

2. The method of claim 1 wherein the resulting anhydropolyaspartic acid (imide) is further partially hydrolyzed to form polyaspartic acid (peptide).

3. The method of claim 1 wherein one member to be irradiated with microwaves is selected from the group consisting of malic acid monoammonium salt, maleic acid monoammonium salt and ammonium salt of maleamic acid.

4. The method of claim 2 wherein one member to be irradiated with microwaves is selected from the group consisting of malic acid monoamminium salt, maleic acid monoammonium salt and ammonium salt of maleamic acid.

5. A method of manufacturing copolyamino acid (imide) by irradiating with microwaves, any one member selected from the group consisting of monoammonium, diammonium, monoamide, diamide and monoamideammonium salts of malic acid, maleic acid, fumaric acid and mixtures thereof, with the addition of at least one amino acid.

6. The method of claim 5 wherein the resulting copolyamino acid (imide) is further partially hydrolyzed to form copolyamino acid (peptide).

7. The method of claim 5 wherein one member to be irradiated with microwaves is selected from the group consisting of malic acid monoammonium salt, maleic acid monoammonium salt and ammonium salt of maleamic acid.

8. The method of claim 6 wherein one member to be irradiated with microwaves is selected from the group consisting of malic acid monoammonium salt, maleic acid monoammonium salt and ammonium salt of maleamic acid.

9. The method of claim 5 wherein the amino acid is selected from the group consisting of $\alpha$-amino acids, $\beta$-amino acids, $\gamma$-amino acids, $\delta$-amino acids and $\epsilon$-amino acids.

10. The method of claim 6 wherein the amino acid is selected from the group consisting of $\alpha$-amino acids, $\beta$-amino acids, $\gamma$-amino acids, $\delta$-amino acids and $\epsilon$-amino acids.

11. The method of claim 5 wherein the amino acid is selected from the group consisting of glycin, alanine, leucine, isoleucine, methionine, lysine, valline, glutamic acid and $\beta$-alanine.

12. The method of claim 6 wherein the amino acid is selected from the group consisting of glycin, alanine, leucine, isoleucine, methionine, lysine, valline, glutamic acid and $\beta$-alanine.

* * * * *